FREE-MACHINING AUSTENITIC STAINLESS STEELS
Original Filed May 14, 1965 5 Sheets-Sheet 1
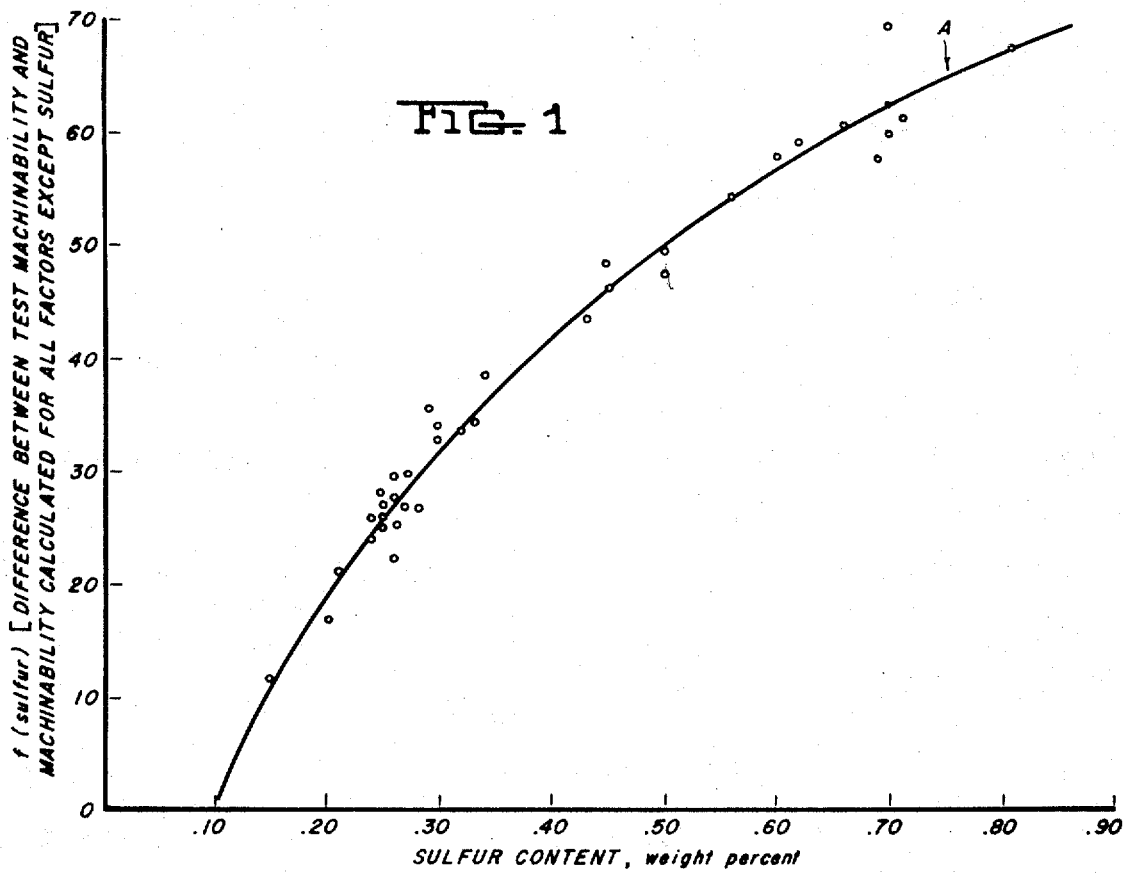
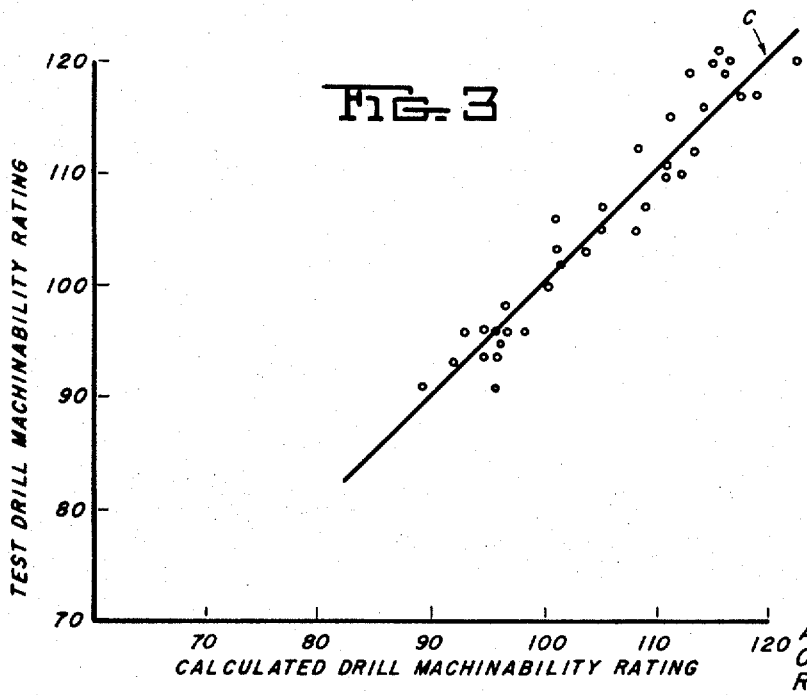
INVENTORS
ARTHUR MOSKOWITZ,
CURTIS W. KOVACH and
RALPH G. WELLS
By John R. Regan
Attorney FREE-MACHINING AUSTENITIC STAINLESS STEELS
Original Filed May 14, 1965 5 Sheets-Sheet 2
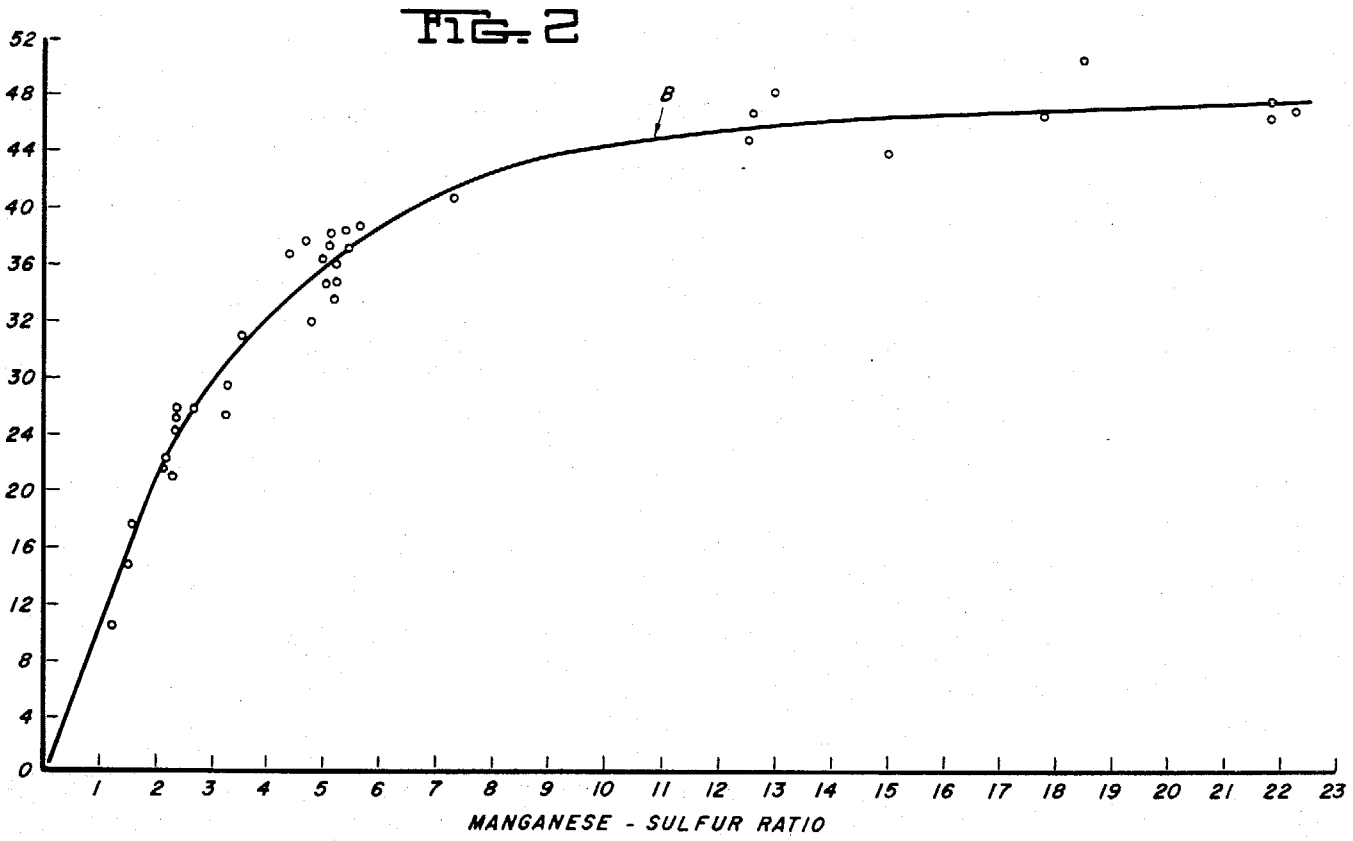
INVENTORS
ARTHUR MOSKOWITZ,
CURTIS W. KOVACH and
RALPH G. WELLS
By John R. Regan
Attorney

FREE-MACHINING AUSTENITIC STAINLESS STEELS

Original Filed May 14, 1965 5 Sheets-Sheet 3

INVENTORS
ARTHUR MOSKOWITZ,
CURTIS W. KOVACH and
RALPH G. WELLS
By John R. Regan
Attorney INVENTORS
ARTHUR MOSKOWITZ,
CURTIS W. KOVACH and
RALPH G. WELLS By John R. Regan
Attorney

FREE-MACHINING AUSTENITIC STAINLESS STEELS

Original Filed May 14, 1965 5 Sheets-Sheet 5

INVENTORS
ARTHUR MOSKOWITZ,
CURTIS W. KOVACH and
RALPH G. WELLS

By John R. Regan
Attorney

United States Patent Office

Re. 27,226
Reissued Nov. 9, 1971

27,226
FREE-MACHINING AUSTENITIC STAINLESS STEELS

Arthur Moskowitz, Curtis W. Kovach, and Ralph G. Wells, Pittsburgh, Pa., assignors to Crucible Inc., Pittsburgh, Pa.

Original No. 3,437,478, dated Apr. 8, 1969, Ser. No. 455,863, May 14, 1965. Application for reissue Jan. 8, 1970, Ser. No. 6,606
Int. Cl. C22c *39/20*
U.S. Cl. 75—128 P 4 Claims

Matter enclosed in heavy brackets [ ] appears in the original patent but forms no part of this reissue specification; matter printed in italics indicates the additions made by reissue.

ABSTRACT OF THE DISCLOSURE

This invention relates to chromium-nickel austenitic stainless steels having improved physical properties, most notably, significantly improved machinability. Specifically, it has been found that steels of this type containing up to 0.50% carbon, from about 0.25 to about 0.45% sulfur, from about 2.0 to about 7.0% manganese, from about 16 to about 30% chromium, from about 5 to 26% nickel, and wherein the manganese-to-sulfur ratio is about at least 8 to 1, are vastly improved with respect to machinability without impairing the corrosion resistance of the alloy to the expected extent at the achieved level of machinability. Optional elements that may be included in the alloy are silicon up to about 3%, molybdenum up to about 4%, zirconium up to about 1%, copper up to about 4%, selenium, tellurium or lead up to about 0.5% each, columbium, tantalum or titanium up to about 2.0% total, nitrogen up to about 0.35%, and phosphorus up to about 0.50%.

This invention relates to chromium-nickel austenitic stainless steels, and particularly to improved steels having enhanced free-machining properties.

As the name indicates, the structure of the contemplated class of stainless steels is predominantly austenitic at ordinary temperatures. Such steels are non-magnetic and are not hardenable by heat treatment, but are hardenable by cold working. Work hardening results from strain hardening and transformation of the steel structure from the relatively softer austenite to a relatively harder martensitic phase during working. Thus, work hardening is a function of the stability of the austenite and the latter, in turn, is largely dependent upon the composition of the steel, i.e., a balancing of ferrite- and austenite-promoting alloying elements.

The principal alloying element in all stainless steels and the one conferring the "stainless" property on the iron base is, of course, chromium. This element is a strong ferritizer and, to offset the effect thereof in the austenitic stainless steels, the element nickel, which is an austenite promoter, is chiefly used to achieve the desired austenite structure and stability. Other elements are also used for such structural balancing, as well as to confer other desired properties on the steels. Such elements are, for example, the ferritizers molybdenum and silicon, and the austenite promoters manganese, carbon, nitrogen and copper. Manganese, for example, has been used in substantial quantities, for example, about 5.5 to 10%, in some austenitic stainless steels, as AISI Types 201 and 202, as a partial substitute for the more expensive and scarcer element nickel, although in most manganese-containing austenitic stainless steels, manganese is limited to a maximum of about 2%, and in actual practice is used in amounts substantially less than 2%.

The austenitic stainless steels are especially useful by reason of the wide range of mechanical properties which are obtainable by cold-working. Thus, the austenitic stainless steels of leaner alloy content, such as AISI Type 301, the common "17–7" steel (17% chromium, 7% nickel), have highest work hardening rates because these steels, containing relatively small amounts of nickel, have an austenitic structure of lesser stability than others of the austenitic steels having a richer alloy content, for example, AISI Type 309 containing about 23% chromium and 12 to 15% nickel.

The available range of mechanical properties of this large class of steels adapts them for many uses requiring a variety of fabricating and finishing operations and conditions. Thus, machinability is an important property in the application of austenitic stainless steels for many purposes. Elements such as sulfur, selenium, tellurium, lead and phosphorus have been added to certain austenitic stainless steels to improve machinability. Thus, a generally used free-machining austenitic stainless steel is AISI Type 303—the common "18–8" stainless steel (AISI Type 302 containing about 18% chromium and 8% nickel together with a maximum of 2% manganese) to which has been added from about 0.15 to 0.35% sulfur.

Although sulfur is an effective additive to such steels for machinability enhancement, it also decreases the corrosion resistance of the steels and makes it difficult to obtain highest surface finishes. Consequently, it is desirable to use the least amount of sulfur compatible with the necessary machinability required for the end application for which the steel is intended.

Accordingly, it is an object of the present invention to provide improved austenitic stainless steels having enhanced machinability.

It is another object of the invention to provide austenitic stainless steels wherein the beneficial effect upon machinability of free-machining additives, such as sulfur, is utilized, while the deleterious effects of such additions upon other properties is minimized.

In accordance with these objects, a preferred embodiment of the invention comprises a free-machining austenitic stainless steel containing about 17 to 19% chromium, about 6.5 to 10% nickel, up to about .15% carbon, up to about 1% silicon, up to about .50% phosphorus, up to about .60% manganese or zirconium, and, in particular, about .30 to .40% sulfur, together with about 3 to 4.5% manganese.

The foregoing and other objects of the invention will become more readily apparent upon an inspection of the following more detailed description and the accompanying drawings, wherein:

FIGURE 1 is a graph relating the effect of sulfur content upon machinability of austenitic stainless steels;

FIGURE 2 is a graph representing the effect, on a rectangular coordinate scale, of manganese-sulfur ratio upon machinability of austenitic stainless steels;

FIGURE 3 is a graph showing correlation between test and calculated drill machinability ratings;

Figure 5:
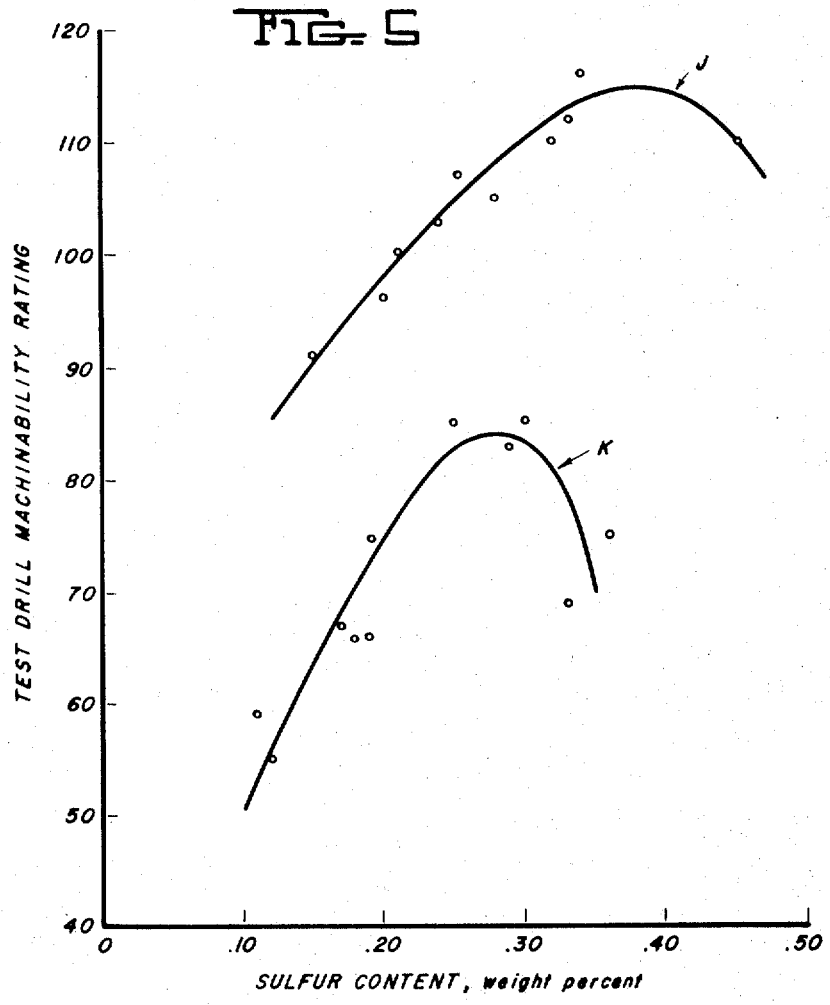
[FIGURES 5A and 5B are photomicrographic illustrations of austenitic stainless steels which contain, respectively, desirably small sulfide inclusions, and harmfully large sulfide inclusions;]
Figure 6:
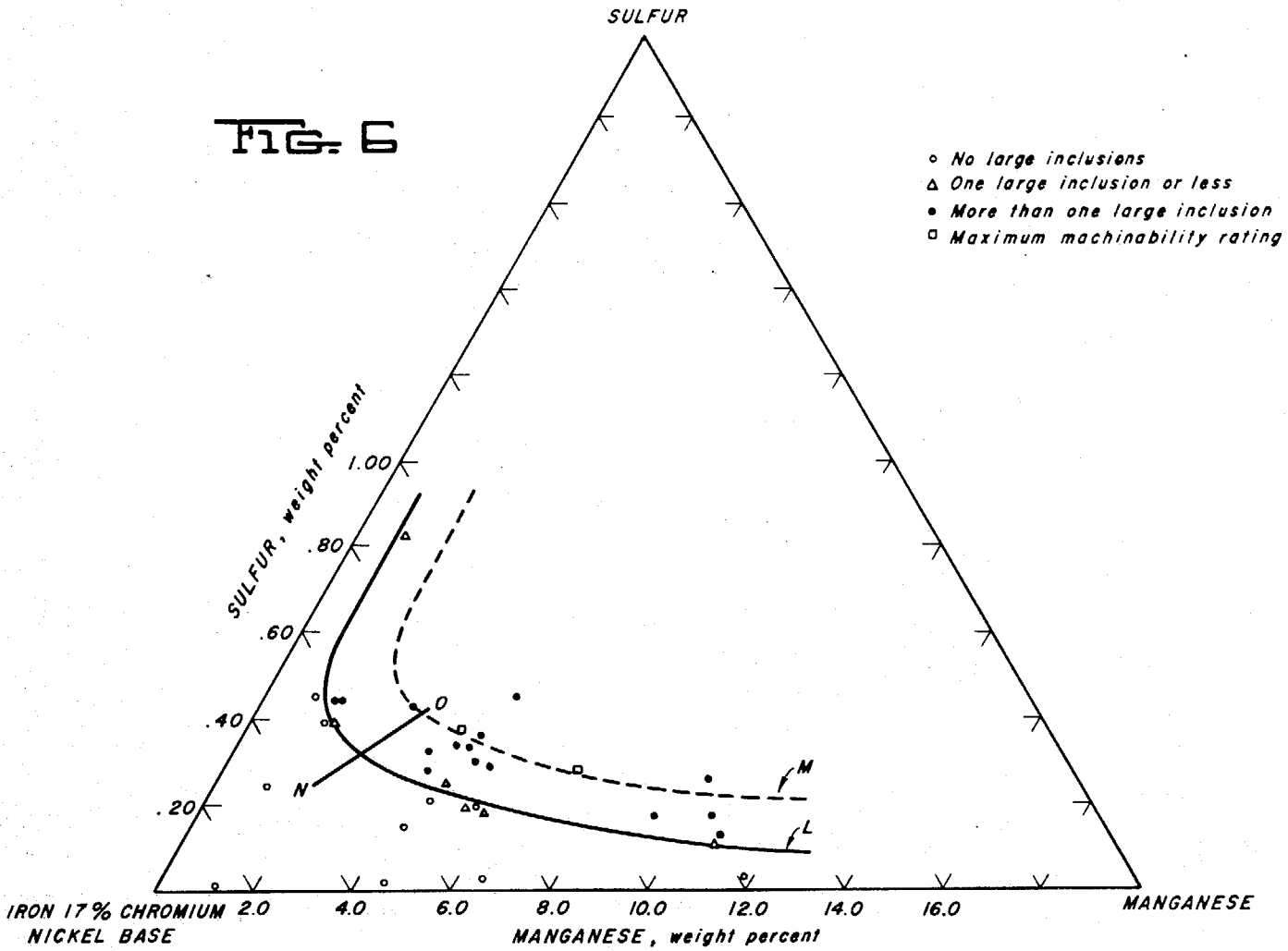

FIGURE 5 comprises graphs illustrating the detrimental effect, upon the drill machinability rating of austenitic stainless steels, of large sulfide inclusions which are formed at high sulfur levels in austenitic stainless steels containing different amounts of manganese; and FIGURE 6 is a ternary diagram graphically illustrating the effect of steel composition upon the appearance therein of large sulfide inclusions, and the relationship of steel composition and large sulfide content to machinability.

A first series of 36 experimental steel heats was prepared wherein the steel comprised a base composition of essentially "18–8" austenitic stainless steel, and wherein varying contents of manganese and sulfur were utilized. The compositions of these experimental steel heats are set forth in Table I.

mined by striking a ratio between the standard bar drilling time and the test bar drilling time and multiplying by 100. Accordingly, test bars with good drill machinability showed a drilling time less than the standard and therefore have a drill machinability rating greater than 100. The test drill machinability ratings so determined are given, for the several test specimens, in Table I.

By a regression analysis of the several factors which

TABLE I

| Test No. | Heat No. | Composition, weight percent | | | | | | | | | Mn/S ratio | Hardness (BHN) | Test drill mach. rating | Calculated drill machinability rating |
|---|---|---|---|---|---|---|---|---|---|---|---|---|---|---|
| | | C | Mn | P | S | Si | Ni | Cr | Mo | Cu | | | | |
| ---------- | 93437-2 | .102 | 1.14 | .007 | .24 | .48 | 9.62 | 17.44 | .01 | .07 | 4.7 | 180 | 93 | 92.1 |
| 1---------- | 93437-2 | .102 | 1.07 | .007 | .45 | .45 | 9.56 | 17.30 | .01 | .08 | 2.4 | 169 | 106 | 101.3 |
| ---------- | 93437-4 | .010 | 1.00 | .007 | .82 | .42 | 9.50 | 17.06 | .01 | .09 | 1.2 | 172 | 110 | 111.0 |
| ---------- | 93496-1 | .070 | 1.63 | -------- | .30 | .56 | 10.02 | 17.78 | .49 | -------- | 5.4 | 153 | 103 | 101.5 |
| 1---------- | 93441-1 | .164 | 1.54 | -------- | .56 | .71 | 9.82 | 17.68 | .25 | -------- | 2.7 | 171 | 115 | 111.5 |
| 3---------- | 93442-1 | .055 | 1.63 | -------- | .45 | .63 | 10.10 | 17.88 | .25 | -------- | 3.6 | 153 | 112 | 108.6 |
| 7---------- | 93443-1 | .158 | 1.63 | -------- | .50 | .67 | 9.36 | 17.76 | .22 | -------- | 3.3 | 166 | 110 | 110.7 |
| 1---------- | 93444-1 | .067 | 1.50 | -------- | .62 | .74 | 9.56 | 17.66 | .22 | -------- | 2.4 | 153 | 119 | 113.0 |
| 5---------- | 93445-1 | .094 | 1.60 | -------- | .70 | .76 | 9.60 | 17.86 | .02 | -------- | 2.3 | 156 | 119 | 116.4 |
| 6---------- | 93445-2 | .086 | 1.55 | -------- | .66 | .74 | 9.64 | 17.78 | .15 | -------- | 2.4 | 152 | 120 | 115.2 |
| 7---------- | 93445-3 | .085 | 1.55 | -------- | .71 | .74 | 9.64 | 17.72 | .33 | -------- | 2.2 | 152 | 120 | 116.1 |
| 8---------- | 93445-4 | .090 | 1.54 | -------- | .70 | .75 | 9.62 | 17.62 | .56 | -------- | 2.2 | 149 | 121 | 115.6 |
| 9---------- | 93446-1 | .079 | 0.98 | -------- | .60 | .77 | 9.64 | 17.92 | .22 | -------- | 1.6 | 149 | 105 | 105.2 |
| 0---------- | 93446-2 | .081 | 2.45 | -------- | .50 | .65 | 9.60 | 17.70 | .22 | -------- | 4.8 | 143 | 117 | 117.5 |
| 1---------- | 93447-1 | .091 | 1.07 | -------- | .70 | .69 | 9.60 | 18.24 | .22 | -------- | 1.5 | 156 | 107 | 109.5 |
| 2---------- | 93447-2 | .079 | 2.27 | -------- | .69 | .71 | 9.52 | 18.06 | .22 | -------- | 3.3 | 149 | 120 | 122.4 |
| 3---------- | 93496-1 | .070 | 1.63 | -------- | .30 | .56 | 10.02 | 17.78 | .49 | -------- | 5.4 | 149 | 102 | 101.5 |
| 2---------- | 93643-1 | .105 | 1.38 | -------- | .27 | .63 | 9.02 | 17.72 | .35 | -------- | 5.1 | 150 | 98 | 96.8 |
| 3---------- | 93643-2 | .105 | 1.38 | .030 | .27 | .63 | 9.02 | 17.72 | .35 | -------- | 5.1 | 157 | 95 | 96.9 |
| 4---------- | 93644-1 | .105 | 1.31 | .030 | .25 | .63 | 9.10 | 17.68 | .33 | -------- | 5.2 | 161 | 94 | 95.0 |
| 5---------- | 93644-2 | .105 | 1.30 | .030 | .25 | .62 | 9.11 | 17.70 | .33 | -------- | 5.2 | 161 | 96 | 95.0 |
| 6---------- | 93644-3 | .104 | 1.30 | .031 | .26 | .61 | 9.11 | 17.72 | .34 | -------- | 5.0 | 162 | 96 | 95.4 |
| 8---------- | 93642 | .105 | 1.39 | .030 | .25 | .68 | 8.92 | 17.90 | .36 | .32 | 5.6 | 157 | 96 | 96.4 |
| 9---------- | 93643-3 | .092 | 1.35 | .029 | .26 | .58 | 9.12 | 17.84 | .36 | .36 | 5.2 | 153 | 91 | 96.0 |
| 0---------- | 93643-4 | .092 | 1.35 | .029 | .26 | .58 | 9.12 | 17.84 | .36 | .36 | 5.2 | 153 | 94 | 96.0 |
| 5---------- | 355511 | .059 | 1.15 | .006 | .26 | .48 | 10.16 | 16.4 | .54 | .07 | 4.4 | 140 | 96 | 93.2 |
| 4---------- | 1293 | .139 | 4.36 | -------- | .15 | .50 | 5.54 | 16.52 | .57 | 1.76 | 29.7 | 163 | 91 | 89.7 |
| 5---------- | 1294 | .139 | 4.19 | -------- | .28 | .49 | 5.60 | 16.48 | .58 | 1.74 | 15.0 | 163 | 105 | 108.5 |
| 6---------- | 1295 | .131 | 4.00 | -------- | .32 | .48 | 5.54 | 16.48 | .57 | 1.76 | 12.5 | 161 | 110 | 112.5 |
| 8---------- | 1297 | .139 | 4.44 | -------- | .20 | .51 | 5.54 | 16.48 | .54 | 1.83 | 22.2 | 161 | 96 | 98.8 |
| 9---------- | 1298 | .140 | 4.27 | -------- | .24 | .52 | 5.66 | 16.40 | .55 | 1.82 | 17.8 | 161 | 103 | 104.8 |
| 0---------- | 1299 | .136 | 4.15 | -------- | .33 | .51 | 5.60 | 16.46 | .55 | 1.71 | 12.6 | 160 | 112 | 113.5 |
| 1---------- | 1300 | .129 | 4.58 | -------- | .21 | .51 | 6.84 | 16.54 | .53 | .28 | 21.8 | 164 | 100 | 100.6 |
| 2---------- | 1301 | .139 | 4.63 | -------- | .25 | .51 | 6.08 | 16.36 | .49 | 1.25 | 18.5 | 155 | 107 | 105.8 |
| 7---------- | 1476 | .106 | 3.14 | -------- | .43 | .42 | 8.30 | 16.30 | .27 | .27 | 7.3 | 161 | 117 | 118.7 |
| 8---------- | 1477 | .106 | 4.41 | -------- | .34 | .47 | 7.50 | 16.24 | .28 | .28 | 13.0 | 164 | 116 | 114.6 |

The steels of test Nos. 2–33, 42–46, 49, 50, 55 and 54–72 were prepared as 50-pound heats which were then split and cast into approximately 12-pound ingots. The steels of test No. 48 was cast as a 50-pound ingot and the steels of test Nos. 77 and 78 were cast as 30-pound ingots. All of the ingots were forged to ¾ inch square bars, except for test Nos. 77 and 78 which were forged to octagonal bars having a dimension of 1 3/16 inches between flats. All of the bars were forged at 1800–2100° F. and, importantly, it was observed that in general the steels not worked satisfactorily, although those steels with higher sulfur contents, e.g., those having sulfur contents in the range of .60 to .80 percent, sometimes developed cracks during hot working. The bars were heat treated for machinability testing by annealing for one hour at 1950° F. and were then water quenched. The hardness of the annealed quenched bars are given in Table I.

The several test bars were then tested for machinability in the above condition, the test being in the form a drill machinability test of the sample bars, to each of which a drill machinability rating was assigned by comparison of the observed drill machinability with that of a comparison standard bar comprising AISI Type 303 stainless steel in a similar heat treated condition and to which standard test bar a drill machinability rating of 100 was assigned. The drill test was made in a direction perpendicular to the longitudinal axis of the test bar. The drill used was a Cleveland Twist Drill No. 3197 high speed steel drill sharpened to a point with a 118° included angle. A vertical drill press was utilized and operated at a uniform speed of 460 r.p.m. A 26-pound weight was suspended from a 7-inch lever arm to provide a constant load on the drill. Twelve 0.400-inch holes were made with three separate drills to evaluate each test specimen. The drilling time for the standard bar was 14.5 seconds and for most test bars the drilling time ranged between 12 and 16 seconds. The drill machinability was determined by striking a ratio between the standard bar drilling time and the test bar drilling time and multiplying by 100. Accordingly, test bars with good drill machinability showed a drilling time less than the standard and therefore have a drill machinability rating greater than 100. The test drill machinability ratings so determined are given, for the several test specimens, in Table I.

By a regression analysis of the several factors which could conceivably have an effect upon the drill machinability of the test steels, it was found that the amount of sulfur and the magnitude of the manganese-sulfur ratio had a significant effect. Thus, the sulfur contents of the Table I steels were plotted against the test drill machinability ratings given in Table I. By this means an initial correlation between these factors was established in accordance with the following equation:

$$M=K_1+f(S) \qquad \text{(Equation 1)}$$

where

M=drill machinability rating
$K_1$=a constant, and
f(S)=the effect of sulfur on drill machinability.

The data establishing a sulfur-machinability relationship exhibited sufficient scatter as to indicate the considerable effect upon machinability of at least one other factor. Other factors having a possible effect upon machinability were considered, but it was found that the only other factor of significance was the manganese-sulfur ratio. Therefore, the difference between observed drill machinability rating and the rating value indicated by the initial sulfur-manganese curve (herein called the "calculated" value) was then plotted against the manganese-sulfur ratio. It was then possible to express machinability as a function of two variables, as follows:

$$M=K_2+f(S)+f(Mn/S) \qquad \text{(Equation 2)}$$

where

M=drill machinability rating
$K_2$=a constant
f(S)=effect of sulfur upon drill machinability rating and
f(Mn/S)=effect of manganese-sulfur ratio upon drill machinability rating.

By such a regression analysis procedure, the relationships between machinability and sulfur on the one hand, and between machinability and manganese-sulfur ratio on the other, were progressively refined to obtain the best description for these factors, as shown in FIGURES 1 and 2.

Graph A of FIGURE 1 represents the effect of sulfur upon machinability, expressed as the difference between the actual test drill machinability rating and the drill machinability rating calculated for all factors except sulfur.

Similarly, Grap B of FIGURE 2 represents the effect of the manganese-sulfur ratio upon machinability expressed as the difference between actual test drill machinability rating and the drill machinability rating calculated for all factors except the manganese-sulfur ratio.

In the final form of Equation 2, based upon the f(S) and the f(Mn/S) relationships illustrated in FIGURES 1 and 2, the constant $K_2$ was found to have a value of 33, and the equation gave good correlation of calculated drill machinability rating with test drill machinability rating, as illustrated by Graph C of FIGURE 3.

It will be seen from FIGURE 1 that increasing the sulfur content up to as much as 0.80% is productive of a continued increase in drill machinability of the test steels. However, as aforesaid, the use of progressively larger quantities of sulfur is known to decrease corrosion resistance, as well as to deleteriously affect fine surface finish.

On the other hand, FIGURE 2 shows that, whereas increasing the manganese-sulfur ratio up to values of about 4 or 5 to 1 results in a rapid and substantially uniform rate of improvement of machinability, the rate of improvement decreases at higher values. Best machinability is obtained at manganese-sulfur ratios over about 8 to 1 or 12 to 1—with little or no further improvement by the use of greater values.

Figure 4:
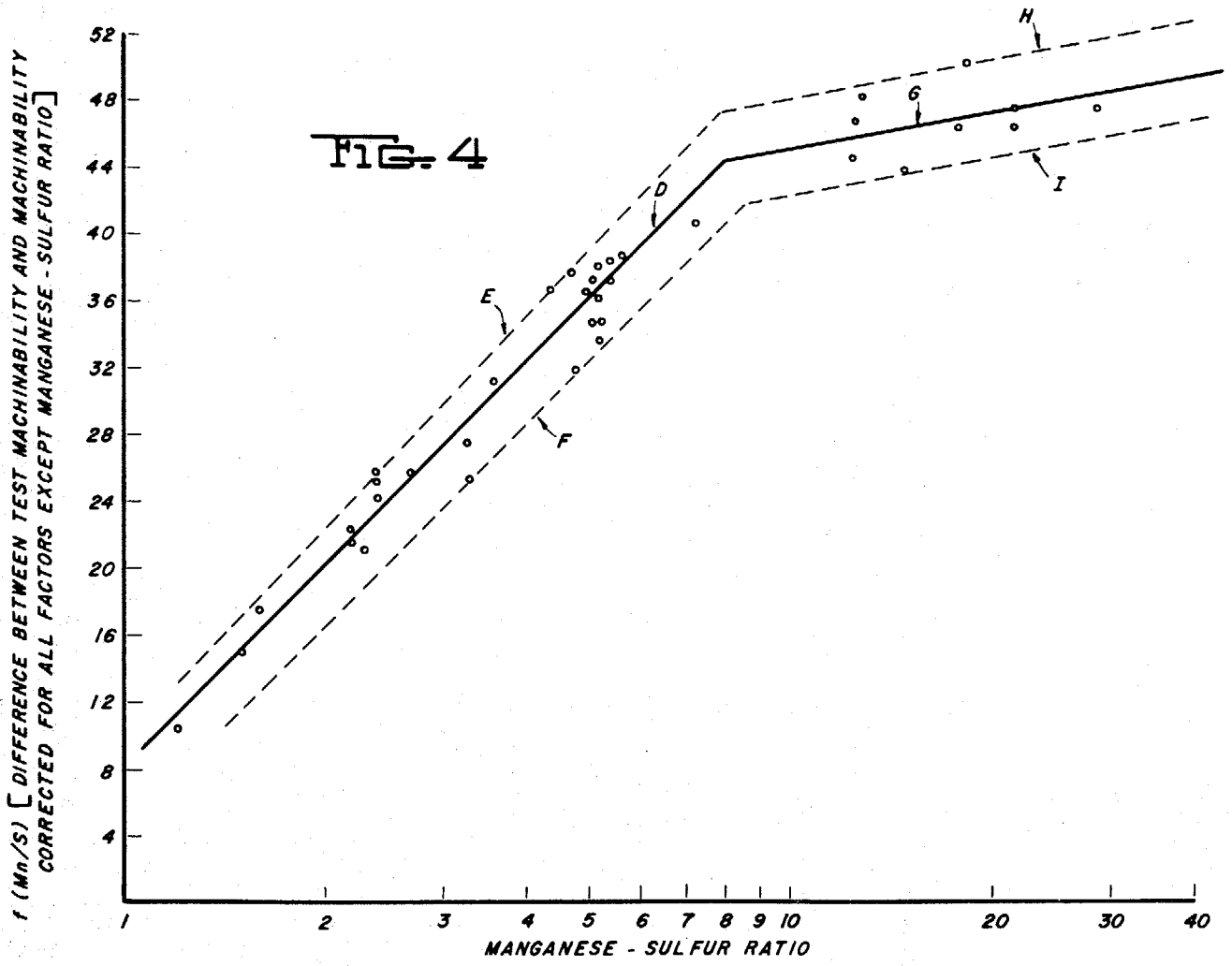
FIGURE 4 is a graph illustrating, on a semi-logarithmic scale, the FIGURE 2 relationship between manganese-sulfur ratio and machinability.

The change in the effect of manganese-sulfur ratio upon machinability is more clearly seen in FIGURE 4 where these factors are plotted on a semi-logarithmic scale. From the latter figure, it is seen that a drastic change in the effect of manganese-sulfur ratio upon drill machinability takes place at a manganese-sulfur ratio of about 8 to 1. Graph D of FIGURE 4 represents the probable average relationship between manganese-sulfur ratios up to 8 to 1, and the actual vs. calculated drill machinability difference for the Table I steels. The observed scatter in the data is bounded within a scatter band defined by dotted line Graphs E and F of FIGURE 4.

As will be seen by inspection of the latter figure, the improvement of machinability, by virtue of increasing the manganese-sulfur ratio, continues at a high rate until a ratio of about 8 to 1 is reached. Thereafter, although there is some further enhancement of machinability with increasing manganese-sulfur ratio, the rate of enhancement is much less than is obtained at manganese-sulfur ratios below 8 to 1. Thus, Graph G of FIGURE 4 represents the probable average relationship between manganese-sulfur ratios over 8 to 1, and the difference between test and calculated drill machinability ratings of the Table I steels. The observed variation in this relationship is encompassed within the scatter band described by dotted line Graphs H and I of FIGURE 4.

It is believed that the improvement in machinability up to the aforesaid 8 to 1 manganese-sulfur ratio is due to a change in composition of sulfide inclusions from complex sulfides which are present at lower manganese-sulfur ratios, to relatively pure manganese sulfides which are formed at manganese-sulfur ratios of 8 to 1 and higher. Thus, photomicrographic evidence shows that, at manganese-sulfur ratios of about 8 to 1 and higher, the sulfides present in the steels of the invention are comparatively transparent sulfides characteristic of relatively pure manganese sulfides. The latter have been found to be relatively much softer than the opaque complex sulfides which have been found to predominate at manganese-sulfur ratios below about 8 to 1, and, accordingly, the soft, manganese sulfides exert a distinctly superior effect on machinability.

Consequently, the invention contemplates the provision of austenitic stainless steels containing sulfur as a free-machining additive, for example, in amounts from about .25 to about .40 or .45%, preferably from about .25 to about .35%, and wherein manganese is preferably added in sufficient quantity as to produce a minimum manganese to sulfur ratio of about 8 to 1, preferably about 10 to 1—all in order to realize the benefits of the relationship of the manganese-sulfur ratio upon machinability as illustrated in FIGURE 4.

It has now been further, found, however, that the benefits of the use of the relatively larger quantities of manganese in the new steels, and the concomitant provision of relatively larger manganese-sulfur ratios than heretofore utilized, is not unlimited in scope. For example, sulfur recovery is reduced at higher manganese levels, such as those over about 7 or 8%. More importantly, it has now been found that large sulfide inclusions tend to be formed in such steels, and that these inclusions have a distinctly deleterious effect upon machinability. It is believed that the beneficial effect of sulfur upon machinability is due to the formation of relatively soft sulfides, comprising principally manganese sulfides. In order to realize the benefit of a given volume of these sulfides, the same must be present in the steel in the form of large numbers of particles of relatively small size evenly distributed throughout the steel matrix. If a significant precentage of the total volume of the beneficial sulfides is present in the form of a relatively fewer number of large sulfides, rather than in the form of large numbers of uniformly distributed finer sulfides, the full benefit of the sulfur addition is not achieved. Ineed, with the formation of increasingly large numbers of large sulfides, the machinability of the steel has been found to decrease, even with the use of increasing quantities of sulfur, simply because the sulfur is tied up in the large sulfides.

[In this regard, reference is made to FIGURES 5A and 5B, comprising photomicrographs, at a magnification of 150 diameters, of polish sections cut from forged bars of exemplary austenitic stainless steels. Thus, FIGURE 5A is such a photomicrograph of a steel, Heat No. 1472, of a steel composition appearing in Table IV hereinbelow, and containing 1.59% manganese and 0.39% sulfur (manganese-sulfur ratio=4.07 to 1). The uniformly distributed dark particles of FIGURE 5A are sulfide inclusions having a mean maximum dimension of about $20\times10^{-4}$ inch or less. On the other hand, FIGURE 5B, a photomicrograph of a steel, Heat No. 1478 of Table IV below, and containing 5.12% manganese and .45% sulfur (manganese-sulfur ratio=11.4 to 1), shows the large sulfides encountered when sulfur is used in excessively large amounts, particularly in conjunction with large amounts of manganese. The maximum dimension of these large includsions is on the order of 5 to 15 or more times greater than that of the beneficial inclusions illustrated in FIGURE 5A. It is sulfide inclusions of the latter type which have been found to prevent maximum utilization of sulfur in the enhancement of free-machining properties of austenitic stainless steels.]

As aforesaid, the formation of such large sulfide inclusions has now been established as critically dependent upon the amounts and proportions of sulfur and manganese in sulfur-containing austenitic stainless steels. In particular, it has been found that these large sulfide inclusions have a pronounced tendency to form in steels containing relatively large amounts of manganese, together with sulfur at the high end of the aforesaid range.

A further series of 10 test steel compositions were selected, the steels having manganese contents of about 4 to 5% (averaging 4.41%), and wherein the sulfur content was varied between about .15% and about .45%. The drill machinability ratings for these steels were determined in accordance with the aforesaid test procedure.

The compositions of such steels, together with the as-quenched hardness and the observed drill machinability ratings thereof, are set forth in Table II.

TABLE II

| Heat No. | Steel composition, weight percent | | | | | | | | Hardness (BHN) | Drill mach. rating |
|---|---|---|---|---|---|---|---|---|---|---|
| | C | Mn | S | Si | Ni | Cr | Mo | Cu | | |
| 293 | .139 | 4.36 | .15 | .50 | 5.54 | 16.52 | .57 | 1.76 | 163 | 91 |
| 297 | .139 | 4.44 | .20 | .51 | 5.54 | 16.48 | .54 | 1.83 | 161 | 96 |
| 300 | .129 | 4.58 | .21 | .51 | 6.84 | 16.54 | .53 | .28 | 164 | 100 |
| 298 | .140 | 4.27 | .24 | .52 | 5.66 | 16.40 | .55 | 1.82 | 161 | 103 |
| 301 | .139 | 4.63 | .25 | .50 | 6.08 | 16.36 | .49 | 1.25 | 155 | 107 |
| 294 | .139 | 4.19 | .28 | .49 | 5.60 | 16.48 | .58 | 1.74 | 163 | 105 |
| 295 | .131 | 4.00 | .32 | .48 | 5.54 | 16.48 | .57 | 1.76 | 161 | 110 |
| 299 | .136 | 4.15 | .33 | .51 | 5.60 | 16.46 | .55 | 1.71 | 160 | 112 |
| 477 | .106 | 4.41 | .24 | .47 | 7.50 | 16.24 | .28 | .28 | 164 | 116 |
| 478 | .105 | 5.12 | .45 | .47 | 6.78 | 16.26 | .27 | .28 | 171 | 110 |

An additional series of test steels were prepared, wherein the steels had a manganese content of from about 5 to about 10%, averaging 7.27%. These additional steels were also tested for machinability as aforesaid, and the compositions, hardness and drill machinability ratings thereof are set forth in Table III.

TABLE III

| Heat No. | Steel composition, weight percent | | | | | | | | | | Hardness (BHN) | Drill machinability rating |
|---|---|---|---|---|---|---|---|---|---|---|---|---|
| | C | Mn | P | S | Si | Ni | Cr | Mo | Cu | N | | |
| 3629-2 | .109 | 10.88 | .006 | .11 | .45 | .71 | 15.96 | .55 | .87 | .26 | 217 | 60 |
| 3629-1 | .130 | 10.87 | .003 | .12 | .44 | .69 | 15.92 | .50 | .78 | .25 | 221 | 55 |
| 3439-4 | .172 | 10.43 | .006 | .17 | .20 | .57 | 15.97 | .55 | 1.05 | .30 | 241 | 67 |
| 3628-1 | .114 | 5.76 | .005 | .18 | .45 | 4.62 | 17.12 | .01 | .04 | .25 | 221 | 66 |
| 3628-2 | .121 | 5.68 | .005 | .19 | .45 | 4.62 | 17.30 | .01 | .05 | .26 | 216 | 66 |
| 3438-3 | .115 | 6.41 | .007 | .19 | .29 | 4.59 | 16.90 | .03 | .09 | .27 | 235 | 75 |
| 3506-4 | .090 | 10.00 | .007 | .25 | .41 | .52 | 15.70 | .51 | 1.11 | .29 | 229 | 85 |
| 3438-4 | .116 | 5.38 | .007 | .29 | .29 | 4.57 | 16.90 | .03 | .09 | .27 | 235 | 83 |
| 3628-3 | .112 | 5.00 | 005 | .30 | .44 | 4.62 | 16.90 | .01 | .06 | .25 | 229 | 85 |
| 3628-4 | .102 | 4.72 | .005 | .33 | .43 | 4.64 | 17.02 | .01 | .06 | .25 | 219 | 69 |
| 3504-4 | .098 | 4.80 | .006 | .36 | .56 | 4.55 | 16.72 | .04 | .10 | .24 | 229 | 75 |

The test bar specimens for both the Table II and the Table III steels were heat treated in a manner similar to that set forth hereinabove for the Table I steels.

The data of Tables II and III, in respect of sulfur contents and drill machinability ratings, are shown graphically in FIGURE [6,] 5, wherein Graph J is based upon the Table II data, and Graph K upon that of Table III.

It will be seen that, for both series of steels, the effect of increasing sulfur content upon machinability reaches a maximum, the machinability rating decreases at sulfur contents above the maximum. In the case of the 4.4% manganese steels of Graph J, the peak machinability is reached at a sulfur level of about .36%, whereas in the 7.3% manganese steels, a sulfur content of about .28 to .30% was productive of maximum machinability.

Such decreases in machinability, despite the use of progressively larger quantities of sulfur than the aforesaid optimum quantities, is attributed to the formation of large sulfide inclusions.

Illustrative of the effect of steel composition, particularly the effect of sulfur and manganese, upon the formation of large sulfide inclusions, a number of test steel bars, including some of the Table I steels, were sectioned and polished. The thus-prepared specimens were then visually inspected under the microscope to determine the presence or absence of sulfide inclusions therein and the relative size and distribution of such sulfides. The sulfide inclusions so observed were classified as either "large" or "small," as aforesaid, the steel compositions and the sulfide inclusions found on specimen inspection being set forth in Table IV.

TABLE IV

| Heat No. | Steel composition, weight percent | | | | | | | | | | Large sulfide rating |
|---|---|---|---|---|---|---|---|---|---|---|---|
| | C | Mn | P | S | Si | Ni | Cr | Mo | Cu | N | |
| 93437-1 | .103 | 1.21 | .007 | .011 | .50 | 9.68 | 17.57 | .01 | .07 | -------- | None.[1] |
| 93437-2 | .102 | 1.14 | .007 | .24 | .47 | 9.61 | 17.38 | .01 | .08 | -------- | Do. |
| 93437-3 | .102 | 1.07 | .007 | .45 | .45 | 9.56 | 17.22 | .01 | .08 | -------- | Do. |
| 93437-4 | .101 | 1.00 | .007 | .82 | .42 | 9.50 | 17.06 | .01 | .09 | -------- | Trace.[2] |
| 1472 | .102 | 1.59 | -------- | .39 | .47 | 9.03 | 16.53 | .27 | .28 | -------- | None. |
| 1473 | .112 | 1.61 | -------- | .39 | .50 | 8.21 | 16.48 | .27 | .27 | -------- | Trace. |
| 1474 | .103 | 1.61 | -------- | .44 | .49 | 7.60 | 16.41 | .28 | .28 | -------- | Major.[3] |
| 1475 | .115 | 1.54 | -------- | .44 | .47 | 6.60 | -------- | .26 | .26 | -------- | Do. |
| 1292 | .139 | 4.57 | -------- | .022 | .51 | 5.54 | 16.52 | .58 | 1.76 | -------- | None. |
| 1293 | .139 | 4.36 | -------- | .15 | .50 | 5.54 | 16.52 | .57 | 1.76 | -------- | Do. |
| 1294 | .139 | 4.19 | -------- | .28 | .49 | 5.60 | 16.48 | .58 | 1.74 | -------- | Major. |
| 1295 | .131 | 4.00 | -------- | .32 | .48 | 5.54 | 16.48 | .57 | 1.76 | -------- | Do. |
| 1300 | .129 | 4.58 | -------- | .21 | .51 | 6.84 | 16.54 | .53 | .28 | -------- | None. |
| 1301 | .139 | 4.63 | -------- | .25 | .50 | 6.08 | 16.36 | .49 | 1.25 | -------- | Trace. |
| 1477 | .106 | 4.41 | -------- | .34 | .47 | 7.50 | 16.24 | .28 | .28 | -------- | Major. |
| 1476 | .106 | 3.14 | -------- | .43 | .42 | 8.30 | 16.30 | .27 | .27 | -------- | Do. |
| 1478 | .105 | 5.12 | -------- | .45 | .47 | 6.78 | 16.26 | .27 | .28 | -------- | Do. |
| 93628-1 | .114 | 5.76 | .005 | .18 | .45 | 4.62 | 17.12 | .01 | .04 | .25 | Trace. |
| 93628-2 | .121 | 5.68 | .005 | .19 | .45 | 4.62 | 17.30 | .01 | .05 | .26 | None. |
| 93628-3 | .112 | 5.00 | .005 | .30 | .44 | 4.62 | 16.90 | .01 | .06 | .25 | Major. |
| 93628-4 | .102 | 4.72 | .005 | .33 | .43 | 4.64 | 17.02 | .01 | .06 | .25 | Do. |
| 93438-1 | .115 | 6.45 | .007 | .029 | .30 | 4.62 | 17.23 | .01 | .05 | .27 | None. |
| 93438-3 | .116 | 5.40 | .007 | .19 | .29 | 4.58 | 17.00 | .02 | .08 | .27 | Trace. |
| 93438-4 | .116 | 5.38 | .007 | .29 | .29 | 4.57 | 16.90 | .03 | .09 | .27 | Major. |
| 93504-4 | .098 | 4.80 | .006 | .36 | .56 | 4.55 | 16.72 | .04 | .10 | .24 | Do. |
| 93439-1 | .166 | 11.83 | .006 | .026 | .19 | .57 | 16.02 | .54 | 1.05 | .30 | None. |
| 93439-4 | .172 | 10.43 | .006 | .17 | .20 | .57 | 15.97 | .55 | 1.05 | .30 | Major. |
| 93506-4 | .090 | 10.00 | .007 | .25 | .41 | .52 | 15.70 | .51 | 1.11 | .29 | Do. |
| 93629-2 | .109 | 10.88 | .006 | .11 | .45 | .71 | 15.96 | .55 | .87 | .26 | Trace. |
| 93629-1 | .130 | 10.87 | .003 | .12 | .44 | .69 | 15.92 | .50 | .78 | .25 | Major. |
| 93629-4 | .125 | 9.33 | .006 | .17 | .42 | .73 | 16.00 | .56 | .88 | .26 | Do. |

[1] No large inclusions observed in visual field upon micrographic inspection of ½ inch square of specimen surface; shown as full open circles in [Figure 7] *Figure 6*.

[2] A fraction to two large inclusions observed per ½ inch square inspection area; shown as half-dark circles in [Figure 7] *Figure 6*.

[3] More than two large inclusions per ½ inch square inspection area; shown as full-dark circles in [Figure 7] *Figure 6*.

The data of Table IV are graphically depicted by the ternary diagram of [FIGURE 7] *FIGURE 6,* wherein the apices of the diagram represent, respectively, sulfur, manganese and the iron—approximately 16 to 17% chromium—nickel base alloy. One coordinate shows a sulfur content variation from 0 to about .80% and another shows manganese varying from 0 to about 12%. It is to be understood that the nickel content of the alloys varies with the manganese content, as given in Table IV, nickel being lowered with increasing manganese content in order to maintain the desired austenite-ferrite balance.

A distinct separation of the test steel compositions is shown, by the thus-plotted data, as consisting of those compositions which contain large sulfide inclusions on the one hand, and on the other hand, those which do not contain large inclusions. This division is represented by Graph L of [FIGURE 7;] *FIGURE 6;* those compositions containing two or more large inclusions falling above Graph L and those containing fewer or no such inclusions falling therebelow.

A further graph, M, of [FIGURE 7] *FIGURE 6* is established by determining for steel compositions having various manganese contents, the sulfur level at which the observed drill machinability rating commences to decrease, in the manner illustrated by Graphs J and K of [FIGURE 6] *FIGURE 5* Graph M of [FIGURE 7,] *FIGURE 6,* so established, is generally parallel to Graph L, so that the conclusion may be drawn that the incidence of the large sulfide inclusions, as delimited by Graph L, may be correlated with machinability. The Graphs L and M are not coincident, that is, the machinability of the steels does not decrease simultaneously with the appearance of small numbers of large sulfides, such a decrease being observed only when a sufficiently large number of large sulfides is formed as to constitute such a large fraction of the total volume of the sulfides present as will, in effect, counteract the benefit of adding more sulfur. As stated, Graph M of [FIGURE 7] *FIGURE 6* represents the dividing line between these opposing effects.

Accordingly, the invention contemplates the provision of austenitic stainless steels wherein sulfur and manganese are so balanced with one another as to fall below the Graph M of [FIGURE 7] *FIGURE 6* and, preferably, below Graph L thereof.

Most useful free machining properties in the contemplated class of stainless steels are obtained when sulfur is present in minimum amount of about .25% and, for reasons aforesaid, it is desirable to limit sulfur on the high side thereof to about .40 or .45%, preferably about .40%. In accordance with the critical showing of FIGURE 2, it is also desirable to incorporate manganese in the novel steels in a minimum amount of the least about 8 times the sulfur content. Consequently, manganese is contemplated in the steels of the invention in amounts over 2%. In accordance with [FIGURE 7] *FIGURE 6* at the contemplated minimum sulfur level, i.e., 25%, manganese may be present in the new steels up to about 8.0%, although, because of the aforementioned difficulty in obtaining controllable sulfur recovery, an upper manganese limit of about 7% is set for the new steels, and manganese is preferably included in maximum amount of about 4.5 to 5.0%, in order to permit the use of higher sulfur contents (for better machinability) without encountering the danger of large sulfide formation and the consequent deterioration of machinability.

Although, as aforesaid, sulfur is preferably limited to a maximum of about .40%, that element may be used in somewhat larger amounts. Inspection of [FIGURE 7] *FIGURE 6* shows that, at the lowest contemplated manganese levels, sulfur may be present up to about 0.55 or 0.60 percent without encountering the large sulfide-decreased machinability area delimited by Graph M. However, at such high sulfur levels, not only are the aforesaid deleterious effects of sulfur most pronounced, but the rapidly contracting range of permissible manganese contents become so small as to make practical melting procedures unreliable or impossible to achieve. Consequently, sulfur may be used in amounts as great as .45%. However, in order to realize the greatest advantages of the invention, the manganese and sulfur contents of the inventive steels are not only balanced within the ranges aforesaid, in accordance with the showing of [FIGURE 7] *FIGURE 6,* but, further are limited to compositions to the right of line N-O of [FIGURE 7,] *FIGURE 6,* which line represent a minimum manganese content of 8 times the particularly contemplated sulfur range of .25 to .40%. It will be appreciated, nevertheless, from the showings of FIGURES 2 and [7,] *6,* and the enhanced machinability which is obtainable with increasing sulfur contents throughout the latter range, but below the 8 to 1 manganese to sulfur ratio, that compositions containing over 2% manganese and falling to the left of line N-O, although having manganese to sulfur ratios less than 8 to 1, still partake of the large sulfide-free nature of compositions balanced in regard to manganese and sulfur in accordance with the limitations set solely by Graphs M and L of [FIGURE 7] *FIGURE 6.*

With the foregoing factors in mind, the following broad, intermediate and preferred compositions are pointed out as especially suitable in the constitution of the steels of the invention.

TABLE V

| Element | Weight percent | | |
|---|---|---|---|
| | Broad | Intermediate | Preferred |
| Carbon | Up to .50 | Up to .25 | Up to .15. |
| Sulfur | .25 to .45 | .25 to .40 | .30 to .40. |
| Manganese | Over 2 to 7 | 2.5 to 5.5 | 3.0 to 4.5. |
| Silicon | Up to 3 | Up to 1 | Up to 1. |
| Nickel | 5 to 26 | 6 to 14 | 6.5 to 10. |
| Chromium | 16 to 30 | 16 to 26 | 17 to 19. |
| Molybdenum | Up to 4 | Up to .60 | Up to .60. |
| Zirconium | Up to 1 | Up to .60 | Up to .60. |
| Selenium, Tellurium, Lead. | Up to .50 ea | | |
| Phosphorus | Up to .5 | Up to .5 | Up to .5. |
| Copper | Up to 4 | Up to 1.5 | |
| Nitrogen | Up to .35 | | |
| Columbium, Tantalum, Titanium. | Up to 2.0 total | | |

Carbon is limited, on the high side of its range, as shown above, in order to avoid the formation, upon annealing, of large quantities of carbides which deleteriously affect the corrosion resistance of the steels. Both carbon and nitrogen are, of course, potent austenite stabilizers and can be adjusted within the respected ranges of each in order to obtain a more or less stably austenitic structure as desired.

At least about 5% nickel is required in the steels of the invention for adjustment of the chemical balance so that the steels are austenitic during hot working and so that they have desirable cold working properties. Cost considerations limit the maximum nickel content of the steels of the invention to the values shown hereinabove in Table V. In the broadest aspect of the invention, in regard to the range of nickel content, when nickel is used near the lower end of its specified range, it is contemplated that manganese is to be used on the high side of its range if more stably austenitic structures are to be obtained. However, the principles of the invention still apply in respect to leaner alloy steels having an austenitic structure of lesser stability.

Molybdenum and zirconium are common additions to austenite stainless steels. For example, molybdenum is often added to these steels because of its function in expanding the passivity range and the tendency to improve corrosion resistance, particularly chloride pit corrosion resistance. Accordingly, molybdenum may be included in the new steels in usual amounts up to about 4%. Molybdenum is, of course, a strong ferritizing element so that steels wherein that element is present must be balanced in respect of the austenite promoting elements n order to obtain a structure of the desired characterstics.

Selenium, tellurium, lead and phosphorus are well-known free-machining additives and, consequently, may be utilized individually or in combination in the steels of his present invention, for example, in amounts up to about .50% of each of these elements. Selenium is particularly desirable in this regard in view of its lesser effect, as compared to sulfur, in decreasing corrosion resistance and in promoting the formation of non-metallic inclusions.

The austenitic stainless steels are particularly susceptible to sensitization, which is generally considered a precipitation of harmful grain boundary constituents. The elements columbium, tantalum and titanium are commonly added to these steels to minimize this disadvantage. They may, accordingly, be added to the steels of this invention for a similar purpose.

Copper is an occasional alloying addition to austenitic stainless steels for its effect in enhancing corrosion resistance, for example, in oil-cracking applications. Copper is also considered an inexpensive austenite-promoting alloy ingredient and is occasionally used for such purpose in austenitic stainless steels. That element, accordingly, may be added to the inventive steels as shown in Table V.

By its provision of limited quantities and a highly critical balance of sulfur and manganese, the invention brings to the art a highly useful new class of steels having all of the known advantages of austenitic stainless steels, together with enhanced free-machining properties which are obtained with a minimal appearance of the heretofore generally experienced disadvantage accompanying the use of sulfur as a free-machining element. Thus, the maximum advantage of this free-machining additive is realized, without detrimentally affecting the wide range of usefulness of the steels in which it is incorporated.

The above examples are illustrative of the principles of the invention and it is to be understood that various additions or modifications may be made by those skilled in the art without departing from the spirit and scope of the invention claimed.

We claim:

1. An austenitic stainless steel of enhanced free-machining properties, consisting essentially of, by weight percent, Carbon—up to 0.25 percent
Sulfur—from about 0.25 to about 0.45 percent
Manganese—from over 2.0 to about 7.0 percent
Chromium—from about 16 to 30 percent
Nickel—from about 5 to about 26 percent
Silicon—up to about 3 percent
Molybdenum—up to about 4 percent
Zirconium—up to about 1 percent
Copper—up to about 4 percent
Selenium, Tellurium, Lead—up to about 0.50 percent each
Columbium, Tantalum, Titanium—up to about 2.0 percent total
Nitrogen—up to about 0.35 percent
Phosphorus—up to about 0.50 percent
Iron—balance, except for incidental impurities and wherein the sulfur and manganese contents are selected, within the respective ranges of each, so as to fall below Graph M of [FIGURE 7.] *FIGURE 6.*

2. A free-machining austenitic stainless steel, consisting essentially of, by weight percent, Carbon—up to 0.25 percent
Sulfur—from about 0.25 to about 0.40 percent
Manganese—from about 2 to about 7 percent
Chromium—from about 16 to about 26 percent
Nickel—from about 6 to about 14 percent
Silicon—up to about 1.0 percent
Molybdenum—up to about 0.60 percent
Zirconium—up to about 0.60 percent
Copper—up to about 1.5 percent
Phosphorus—up to about 0.50 percent
Iron—balance, except for incidental impurities and wherein the sulfur and managanese contents are selected, within the respective ranges of each, so as to fall below Graph M of [FIGURE 7.] *FIGURE 6.*

3. A free-machining austenitic steel, consisting essentially of, by weight percent, Carbon—up to about 0.15 percent
Manganese—from over 2 to about 4.5 percent
Chromium—from about 16 to about 19 percent
Nickel—from about 6.5 to about 10 percent
Silicon—up to about 1.0 percent
Iron—balance, except for incidental impurities, the steel also containing at least about 0.25 percent sulfur, the manganese-to-sulfur ratio being at least about 8 to 1, and the sulfur content being selected so as to fall below the Graph L of [FIGURE 7.] *FIGURE 6.*

4. A wrought free-machining austenitic chromium-nickel-manganese stainless steel article, consisting essentially of up to .25 percent carbon, from about 16–19 percent chromium, from about 6.5 to about 10 percent nickel, from about 0.25 to about 0.40 percent sulfur, wherein the manganese content is from over 2 to about 7 percent and is at least about 8 times the sulfur content, balance iron and wherein substantially all of the sulfur is present in the form of uniformly distributed sulfide particles having a maximum dimension less than about .010 inch.

References Cited

The following references, cited by the Examiner, are of record in the patented file of this patent or the original patent.

UNITED STATES PATENTS

| | | | |
|---|---|---|---|
| 2,484,903 | 10/1949 | Payson | 75—128 |
| 2,496,245 | 1/1950 | Jennings | 75—128 |
| 2,557,862 | 6/1951 | Clarke | 75—128 |
| 2,687,955 | 8/1954 | Bloom | 75—128 |
| 2,697,035 | 12/1954 | Clarke | 75—128 |
| 2,891,858 | 6/1959 | Kegerise | 75—128 X |

HYLAND BIZOT, Primary Examiner

U.S. Cl. X.R.

75—128 R